United States Patent
Malhotra et al.

(10) Patent No.: US 11,068,140 B2
(45) Date of Patent: Jul. 20, 2021

(54) INTELLIGENT OVERFLOW MENU

(71) Applicant: ServiceNow, Inc., Santa Clara, CA (US)

(72) Inventors: Rakesh Malhotra, Hyderabad (IN); Sujit Sharma, Hyderabad (IN); Saurabh Khetan, Fremont, CA (US)

(73) Assignee: ServiceNow, Inc., Santa Clara, CA (US)

( * ) Notice: Subject to any disclaimer, the term of this patent is extended or adjusted under 35 U.S.C. 154(b) by 54 days.

(21) Appl. No.: 16/240,471

(22) Filed: Jan. 4, 2019

(65) Prior Publication Data
US 2020/0218432 A1     Jul. 9, 2020

(51) Int. Cl.
*G06F 3/0484*     (2013.01)
*G06F 3/0481*     (2013.01)
*G06F 3/0482*     (2013.01)

(52) U.S. Cl.
CPC ........ *G06F 3/04845* (2013.01); *G06F 3/0482* (2013.01); *G06F 3/04817* (2013.01)

(58) Field of Classification Search
CPC ............... G06F 3/04845; G06F 3/0482; G06F 3/04817; G06F 9/44526; G06F 9/451; G06F 3/0483
See application file for complete search history.

(56) References Cited

U.S. PATENT DOCUMENTS

| | | | |
|---|---|---|---|
| 6,321,229 B1 | 11/2001 | Goldman | |
| 6,609,122 B1 | 8/2003 | Ensor | |
| 6,799,189 B2 | 9/2004 | Huxoll | |
| 6,816,898 B1 | 11/2004 | Scarpelli | |
| 6,895,586 B1 | 5/2005 | Brasher | |
| 7,027,411 B1 | 4/2006 | Pulsipher | |
| 7,028,301 B2 | 4/2006 | Ding | |
| 7,062,301 B1 | 6/2006 | Warpenburg | |
| 7,131,037 B1 | 10/2006 | LeFaive | |
| 7,170,864 B2 | 1/2007 | Matharu | |
| 7,350,209 B2 | 3/2008 | Shum | |
| 7,392,300 B2 | 6/2008 | Anantharangachar | |
| 7,610,512 B2 | 10/2009 | Gerber | |
| 7,617,073 B2 | 11/2009 | Trinon | |
| 7,685,167 B2 | 3/2010 | Mueller | |
| 7,689,628 B2 | 3/2010 | Garg | |
| 7,783,744 B2 | 8/2010 | Garg | |
| 7,890,802 B2 | 2/2011 | Gerber | |

(Continued)

OTHER PUBLICATIONS

How do I get a copy of the Android overflow menu icon? downloaded webpage Jan. 4, 2019, 1 page https://stackoverflow.com/questions/17557183/how-do-i-get-a-copy-of-the-android-overflow-menu-icon.

*Primary Examiner* — Daniel W Parcher
(74) *Attorney, Agent, or Firm* — Fletcher Yoder PC (57) ABSTRACT

The disclosed subject matter relates to the presentation of context-sensitive or context-dependent selectable option in an interface of a client device. In an implementation of the context-sensitive interface, data indicative of a context of a program or program feature is acquired or accessed and used to determine menu options displayed on an overflow menu when an overflow icon displayed on the interface is selected. In some embodiments, the overflow menu is populated with a plurality of secondary action options based on the context data, in which each secondary action option is associated with a corresponding secondary action that may be performed via the client device.

15 Claims, 8 Drawing Sheets

(56) References Cited

U.S. PATENT DOCUMENTS

| | | |
|---|---|---|
| 7,930,396 B2 | 4/2011 | Trinon |
| 7,933,927 B2 | 4/2011 | Dee |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,224,683 B2 | 7/2012 | Manos |
| 8,266,096 B2 | 9/2012 | Navarrete |
| 8,380,645 B2 | 2/2013 | Kowalski |
| 8,457,928 B2 | 6/2013 | Dang |
| 8,478,569 B2 | 7/2013 | Scarpelli |
| 8,554,750 B2 | 10/2013 | Rangaranjan |
| 8,646,983 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,887,133 B2 | 11/2014 | Behnia |
| 9,015,188 B2 | 4/2015 | Behne |
| 9,037,536 B2 | 4/2015 | Vos |
| 9,137,115 B2 | 9/2015 | Mayfield |
| 9,239,857 B2 | 1/2016 | Trinon |
| 9,323,801 B2 | 4/2016 | Morozov |
| 9,412,084 B2 | 9/2016 | Kowalski |
| 9,467,344 B2 | 10/2016 | Gere |
| 9,535,737 B2 | 1/2017 | Joy |
| 9,557,969 B2 | 1/2017 | Sharma |
| 9,613,070 B2 | 4/2017 | Kumar |
| 9,659,051 B2 | 5/2017 | Hutchins |
| 9,792,387 B2 | 10/2017 | George |
| 9,852,165 B2 | 12/2017 | Morozov |
| 10,002,203 B2 | 6/2018 | George |
| 2005/0132296 A1* | 6/2005 | Milic-Frayling ..... G06F 16/954 715/745 |
| 2006/0161889 A1* | 7/2006 | Stabb .................... G06F 3/0482 717/113 |
| 2006/0218502 A1* | 9/2006 | Matthews ............. G06F 3/0482 715/779 |
| 2006/0224989 A1* | 10/2006 | Pettiross ............... G06F 3/0481 715/779 |
| 2012/0185456 A1* | 7/2012 | Hart ........................ G06F 16/16 707/706 |
| 2013/0019182 A1* | 1/2013 | Gil ........................ G06F 3/0482 715/738 |
| 2014/0026099 A1* | 1/2014 | Andersson Reimer ..................... G06F 3/0482 715/825 |
| 2015/0365543 A1* | 12/2015 | Iwata ................. H04N 1/00925 358/1.13 |
| 2017/0315686 A1* | 11/2017 | Matthews ............. G06F 3/0482 |

* cited by examiner

INTELLIGENT OVERFLOW MENU

BACKGROUND

The present disclosure relates generally to interface operations, and more specifically, to a selection interface that is context sensitive.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

A user may use an interface of a client device in a cloud computing environment (such as a computer or workstation) to perform certain actions enabled by the interface. For example, the interface may include selectable features, such as icons, graphics, indicators, and the like, that the user may select to perform a desired action. In some interfaces, as the number of selectable features displayed increases, an effectiveness of a particular interface may decrease. For example, presenting a high number of selectable features on the interface may result in crowding and/or disorganization of the interface. As a result, it may be cumbersome and inconvenient for the user to navigate the interface and select an action to be performed.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The disclosed subject matter relates to the presentation of context-sensitive or context-dependent selectable options in an interface of a client device. In an implementation of the context-sensitive interface, data indicative of a context of a program or program feature (e.g., an application or plug-in) is acquired or accessed and used to determine menu options displayed when an overflow icon is displayed on the client device interface is selected. In some embodiments, the overflow menu is populated with a plurality of secondary action options based on context data, in which each secondary action option is associated with a corresponding secondary action that may be performed via the client device.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. Furthermore, as used herein, a "plug-in" refers to any component (e.g., an extension or add-on) that may change (e.g., modify or enhance) an aspect of an application. For example, the plug-in may extend existing features, remove existing features, enable additional features, facilitate communication with external data or applications, and so forth. In general, and as used herein, an application may be installed onto and uninstalled from a client device, whereas a plug-in may be installed onto a client device (e.g., modify an existing application) and repaired, but not typically uninstalled from the client device. As used herein, the term "interface" refers to a set of displayed options or features, such as may be displayed on a client device (e.g., desktop computer, laptop, mobile phone, tablet, and the like), with which a user of the client device may interact to configure or perform a desired action. The interface may allow a user to interact with, control, or operate an application or interface feature to execute a particular action. For example, the interface may display features such as menus or menu options or selections, in which each feature is associated with an action that may be performed when interacted with by the user. As used herein, the term "feature" refers to any selectable item displayed on the interface, such as a menu option, an icon, an indicator, an image, and the like, that causes an action to be performed when selected by the user.

As discussed herein, a user, such as an individual and/or an organization, may use cloud-based applications to perform various functions. For example, the user may use an interface of the cloud-based application, which may or may not include installed plug-ins, to perform a desired action. The interface may display a number of features that each enable an action to be performed when interacted with by the user. The interface may enable primary actions and secondary actions to be performed. As used herein, a primary action refers to an action that may be performed upon a selection of a feature that is displayed on the interface without the user having to navigate through multiple interfaces (e.g., by selecting multiple other features). As further used herein, a secondary action refers to an action associated with a feature that is not displayed on the interface by default, but the feature may be displayed after selection of a different feature on the interface. For example, primary actions may be associated with features that are more frequently selected by the user and/or associated with actions that a designer of the interface primarily intended to be performed. Secondary actions may be associated with any other actions that may be performed via the interface, such as actions associated with features that are not as frequently selected by the user or that otherwise supplement the primary actions of the interface.

Certain interfaces may include an overflow icon that the user may select to display features associated with secondary actions. For example, when the user selects the overflow icon, an overflow menu may be invoked on the interface to display a list of secondary action options. Each secondary action option may be selectable by the user to perform an associated secondary action. In certain existing interfaces, the overflow menu may be manually configured (e.g., code, customized by a designer) to display the desired secondary action options and to enable performing the associated secondary actions. Thus, the respective overflow menus of different interfaces may each be designed accordingly with respect to the interface in which the overflow menu is implemented. However, designing each overflow menu (e.g., populating the overflow menu with relevant secondary action options) based on the implemented interface may be cumbersome or inefficient.

With this in mind and as discussed herein, a customized overflow menu with context-sensitive selectable options may be added to an interface. That is, a context of the interface is determined and is used to configure the overflow menu. In some embodiments, a program may be implemented (e.g., added) to the interface, in which the program is configured to receive the context to configure the overflow menu. As an example, the program may include a suitable script or code, such as:

```
<sn-overflow-menu
    config=<< config >>
    context=<< Parent context as JSON >>
placement=[ left | right | top | bottom ]>
/sn-overflow-menu>
``` in which data indicative of the context of applications or plug-ins referenced by the interface may be received to configure the overflow menu and/or the overflow icon accordingly. As used herein, the context may include aspects of the interface (or referenced applications and/or plug-ins) that may be relevant to the features of the overflow menu. In one example, the context may include design aspects or configured parameters, such as a coding, a status, a parameter, or any combination thereof, of the interface and/or of an application or plug-in associated with the interface. In another example, the context may include a state determination of the interface and/or of an application or plug-in associated with the interface, such as a permissions status of a user of the interface, a presence or installation of a module associated with the interface, and the like.

The context of the interface may be used to determine secondary actions and associated secondary action options that are relevant to the interface. Accordingly, the overflow menu may be generated and designed based on the determined secondary actions and secondary action options. For example, the program implemented on the interface may employ:

```
config = [
    {
        name:"Option1",
        tooltip: "Option1 tooltip",
        action: &
        childOptions: [
            {
                name:"Child Option1",
                tooltip: "Child option1 tooltip",
                action: &
            }
        ]
    }
]
``` to populate the overflow menu with the determined secondary action options. In such an example, a name of the secondary action option, a tooltip or message that may appear to describe the secondary action option, and/or an associated action of the secondary action option may be configured accordingly. However, it should be understood that in additional or alternative embodiments, other aspects of the secondary action options may be configured.

In some embodiments, an appearance of the overflow menu and/or the overflow icon may also be set based on the context of the interface. That is, a size, a location or position on the interface, a geometry, and so forth, of the overflow menu and/or the overflow icon may depend on the context of the interface. In this manner, the overflow menu is readily and automatically configured and designed for the particular interface. That is, the overflow menu may be created on different types of interfaces (e.g., chat interfaces, web based interface), different platforms (e.g., desktop computer, mobile device), and different implementations (e.g., application management, community forums) without having to manually design (e.g., code, customize, configure) aspects of the overflow menu. Thus, interfaces may be more easily and/or efficiently designed.

Figure 1:
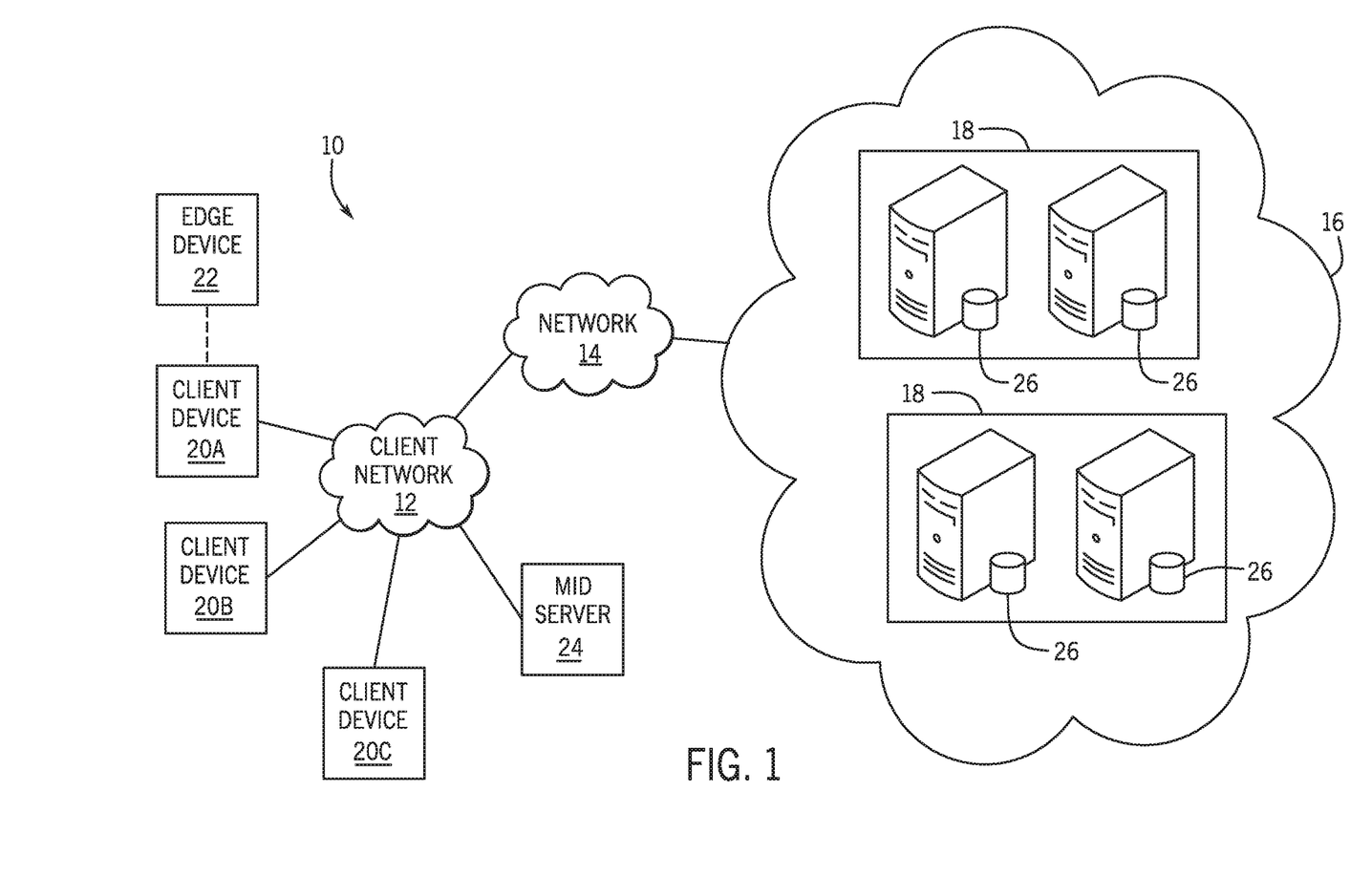
FIG. 1 is a block diagram of an embodiment of a cloud architecture in which embodiments of the present disclosure may operate.
Figure 2:
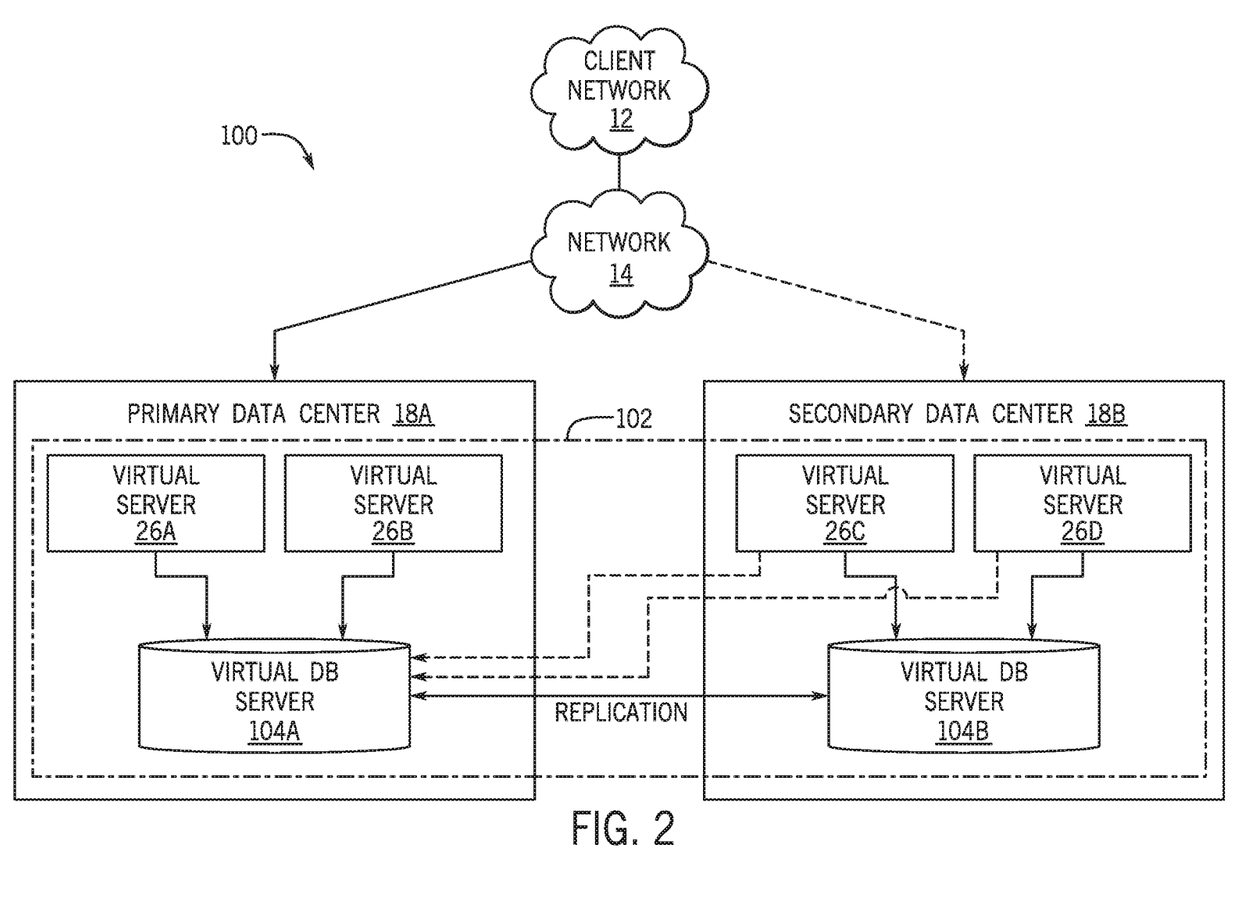
FIG. 2 is a schematic diagram of an embodiment of a multi-instance cloud architecture in which embodiments of the present disclosure may operate.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
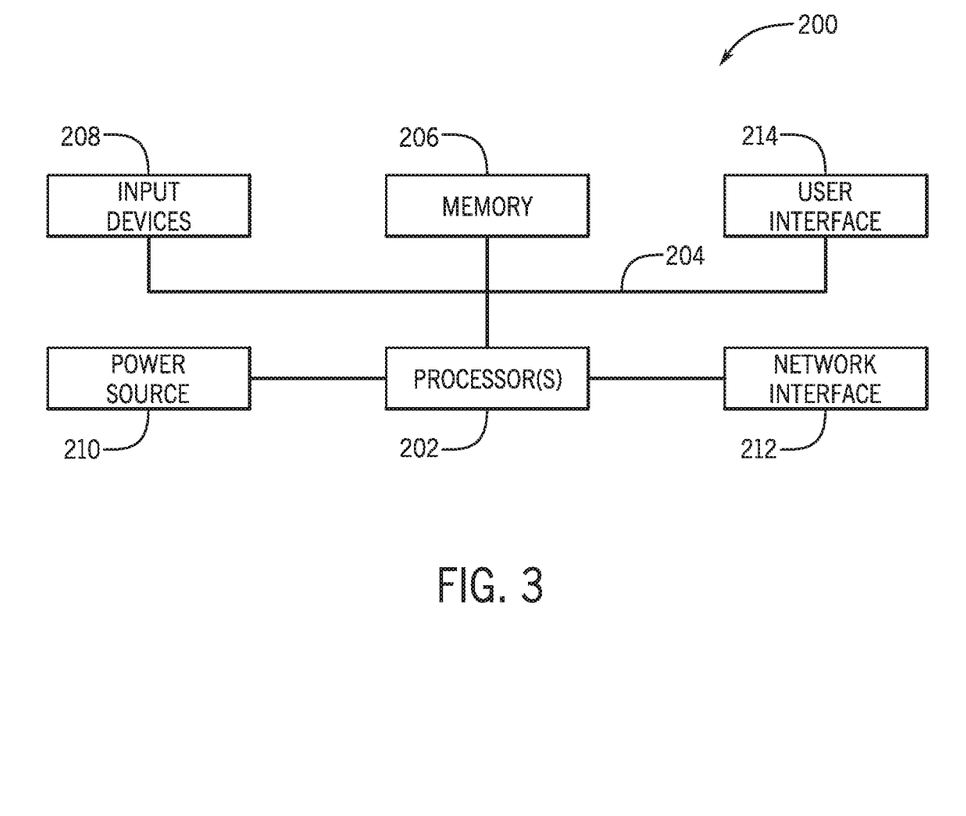
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
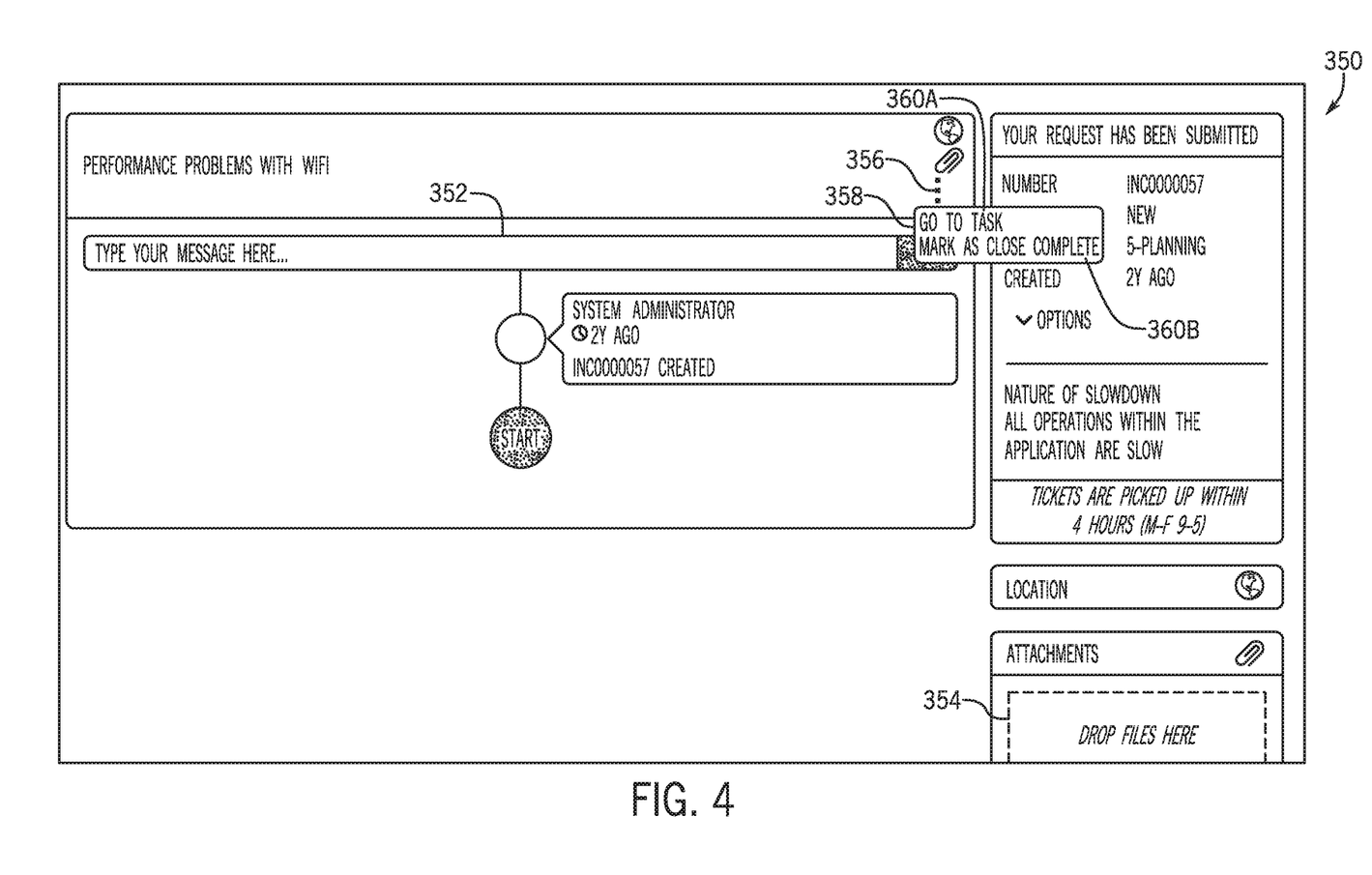
FIG. 4 is an embodiment of an interface that may be utilized for customer relationship management (CRM), in which the interface has an overflow menu icon and an associated overflow menu having selectable context-dependent options, in accordance with aspects of the present disclosure.

With the preceding in mind, FIG. 4 illustrates an embodiment of an interface 350, which may be used for client relationship management (CRM). For example, the interface 350 may be interacted with by a user (e.g., a customer service representative) to handle a particular task submitted by a client (e.g., a customer). As such, the interface 350 may include certain elements (e.g., icons, graphics, images) that enable the user to perform primary actions directed toward communicating with a client. For example, the interface 350 may include a message input section 352 that enables the user to input text. The user may submit the inputted text to be seen by the client (e.g., via one of the client devices 20 of the client). Furthermore, the interface 350 may include an attachment input section 354 that enables the user to attach (e.g., upload) files (e.g., documents, images) via the interface 350. Such files may also be submitted to be seen by the client. The interface 350 may also include additional or alternative elements to enable performing other primary actions not already described, such as to update a status of the task associated with the interface 350.

In addition to having elements that enable the user to perform primary actions, the interface 350 may also have an overflow icon 356 and an overflow menu 358 to enable the user to perform secondary actions. As an example, the secondary actions may include managing the status of the task associated with the interface 350. In the illustrated embodiment, the secondary action options 360 are displayed as part of the overflow menu 358, in which the secondary action options 360 are aligned relative to one another in a column. However, it may be appreciated that in additional or alternative embodiments, the secondary action options 360 may be aligned in other suitable manners, such as in a row, in a table, and so forth. Further, as depicted on FIG. 4, a first secondary action option 360A may enable navigation to the task (e.g., a task interface) associated with the interface 350, which may direct the user to a different interface. A second secondary action option 360B may enable marking the task associated with the interface 350 as complete. However, it should be appreciated that additional or alternative secondary action options 360 may be displayed on the overflow menu 358.

In some embodiments, the overflow menu 358 is invoked and displayed on the interface 350 upon selecting the overflow icon 356. In other words, the interface 350 does not display the overflow menu 358 having the secondary action options 360 until the user selects the overflow icon 356. In the illustrated embodiment, the overflow menu 358 is displayed adjacent to the overflow icon 356, though it should be understood that in additional or alternative embodiments, the overflow menu 358 may be displayed elsewhere on the interface 350. Moreover, when the overflow menu 358 is invoked and displayed on the interface 350, the user may select another element of the interface 350 (e.g., re-selecting the overflow icon 356) to remove the overflow menu 358 from display on the interface 350. In this manner, the overflow icon 356 and the overflow menu 358 enables the interface 350 to show and hide available secondary actions according to the user.

In certain embodiments, the overflow icon 356 and the overflow menu 358 may be automatically incorporated onto the interface 350 and the menu 358 may be populated with options in response to implementation of an executable routine (e.g., executable on the client device 20 or other device on the cloud computing system 10). That is, the options presented in the overflow menu 358 are generated and displayed on the interface 350 without having to code, customize, or otherwise configure the overflow menu 358 manually. In some embodiments, a designer of the interface 350 may employ a plug-and-play type routine or executable to configure the context-sensitive option of the overflow menu 358 and in response, the program may receive data indicative of a context of the interface 350 or application or plug-ins related to the interface 350 and automatically populate the overflow menu 358 with the secondary action options 360 based on the received context data. For example, the executable may review or process the coding of the interface 350 and, based on the coding, the executable may determine that the interface 350 pertains to a particular task and that relevant secondary actions relate to performing the task, providing a state or status of the task, modifying the task, and so forth. As a result the overflow menu 358 invoked in response to selection of the overflow icon 356 is populated with the relevant secondary action options 360. As such, the designer of the interface 350 does not have to manually create or populate the overflow menu 358 with the secondary action options 360, but instead relies upon the automatically derived or determined contexts of available, reasonable, or likely actions to populate the overflow menu 358.

The secondary action options 360 may be configured to perform the relevant corresponding secondary action upon selection of the particular secondary action option 360. For example, the first secondary action option 360A in the depicted example is configured to enable navigation to the task when the first secondary action option 360A is selected. The second secondary action option 360B is, conversely, configured to enable marking the task as complete when the second secondary action option 360B is selected.

As will be appreciated, other appearances of the overflow icon 356 and/or the overflow menu 358 may be provided. For example, FIG. 4 depicts the overflow icon 356 as positioned at a particular location on the interface 350. In certain embodiments, a location of a particular element (e.g., a header) may be determined on the interface 350 and accordingly, the overflow icon 356 may be positioned atop the particular element on the interface 350. In additional or alternative embodiments, a designer may designate the location of the overflow icon 356 easily (e.g., by adjusting a configuration setting or parameter). Moreover, in FIG. 4, the overflow icon 356 appears to include three square-like symbols aligned generally vertically to one another, and the overflow menu 358 has a generally rectangular shape. Such appearances may also be adjusted based on developer preference. As will be appreciated, additional or alternative appearances, such as of the secondary action options 360 (e.g., the font style and/or font size), may also be configured. In certain examples, certain features not depicted by FIG. 4 may be added, including tooltip messages, additional overflow icons and/or menus, additional icons associated with the overflow icon 356 and/or overflow menu 358, and/or other menus to facilitate interactions between the user and the interface 350.

Figure 5:
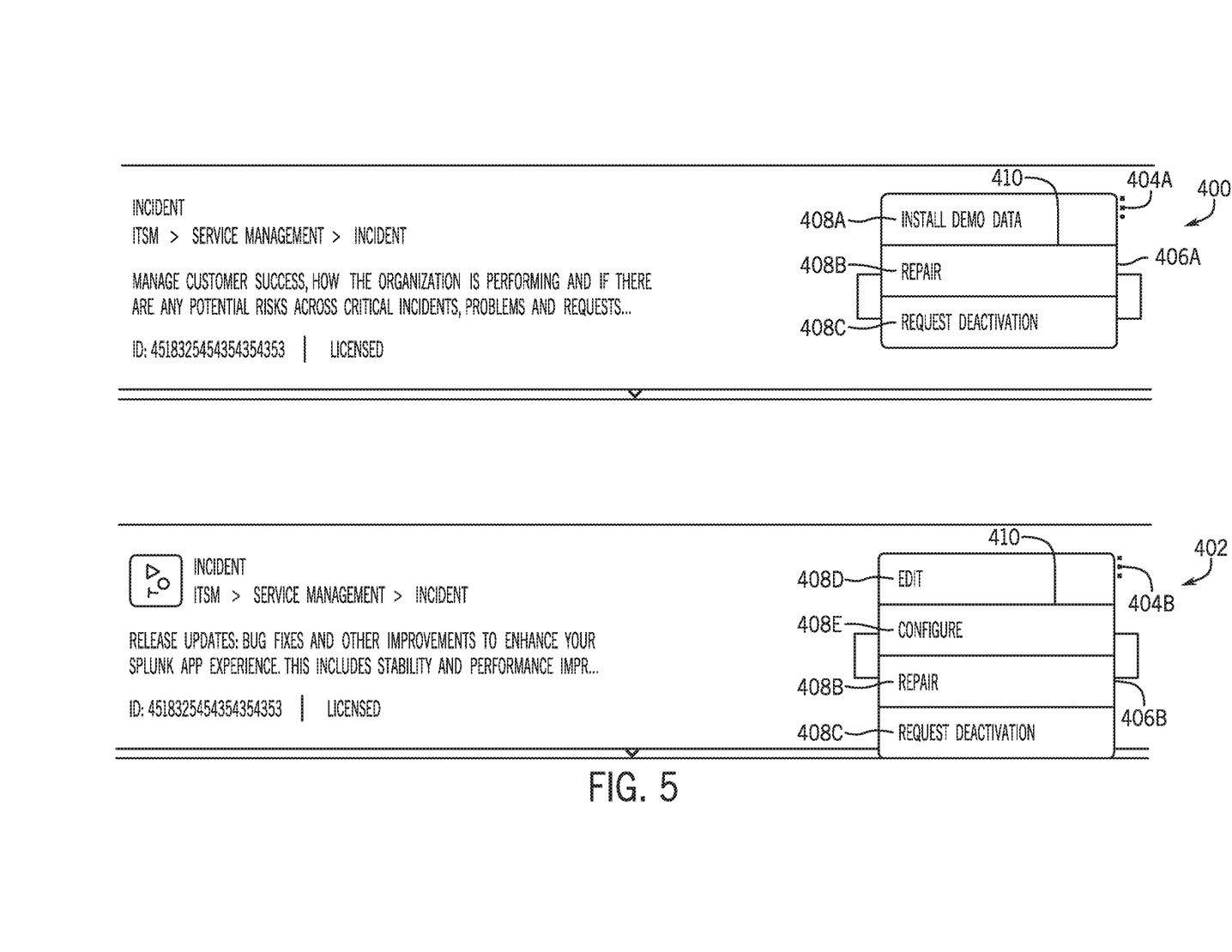
FIG. 5 is an embodiment of two interfaces comparing different overflow menus that may be generated based on different contexts, in accordance with aspects of the present disclosure.

It should be understood that the present approach may be incorporated into other interfaces having other contexts. FIG. 5 illustrates an embodiment of a first incident interface 400 and a second incident interface 402, in which the first and second incident interfaces 400, 402 may each be interacted by the user to manage an incident. The first incident interface 400 and the second incident interface 402 may each include an overflow icon 404 and an associated overflow menu 406 that may be invoked and displayed on the respective incident interfaces 400, 402 upon selection of the respective overflow icon 404. The data indicative of the context of each of the different incident interfaces 400, 402 may be received, such as by an executable routine configured to populate the overflow menus 406 in a context sensitive manner, as discussed herein, and the respective overflow icon 404 and overflow menu 406 may be generated based on the context.

The incident interfaces 400, 402 may reference applications and/or plug-in having different contexts than those referenced by the prior interface 350. As a result, the overflow menu 406 of FIG. 5, which may be generated based on the different contexts, may be different than the overflow menu 358 of FIG. 4. In one example, the overflow menus 406 of FIG. 5 may include secondary action options 408 that pertain to managing a particular incident, which are different than the secondary action options 360 of the overflow menu 358 of FIG. 4 that pertain to communicating with a client.

Moreover, the first incident interface 400 and the second incident interface 402 may differ based on the context of the applications or plug-ins they reference. As a result, the overflow menu 404A of the first incident interface 400 may also be different than the overflow menu 404B of the second incident interface 402. In the illustrated embodiment, the first incident interface 400 may be associated with a device (e.g., client device 20) that does not have an item (e.g., information) labeled as "demo data." As such, an executable run to populate the overflow menu 404A may determine that the context of the referenced item "demo data" is "not present" and, therefore, the overflow menu 404A may be populated with options that correspond to the absence of the referenced "demo data," such as an option 408A to install the demo data. Similarly, a repair secondary action option 408B and a deactivate secondary action option 408C may be present in the overflow menu 406A to indicate options that are appropriate based on the context of a plug-in or application referenced by the options present in the overflow menu 406A. In this example, the repair secondary action options 408B may enable a referenced plug-in or application to be repaired by invoking the appropriate repair routines. Conversely, the deactivate secondary action option 408C may cause the referenced application or plug-in to be deactivated.

Conversely, and as illustrated in the incident interface 402, the referenced "demo data" may instead have a context of "present". As a result, some or all of the options provided in the overflow menu 404B may differ from the example above to reflect the presence or availability of the demo data. For example, options 408 in this example now include an edit option 408D and a configure option 408E in response to the availability of the demo data. In this example, the edit secondary action option 408D may enable the user to edit the "demo data" and the configure secondary action option 408E may enable the user to configure the "demo data" in accordance with the incident in question. Additionally, the repair secondary action option 408B and/or the deactivate secondary action option 408C may remain available, indicating that these options are available regardless of the present context associated with the "demo data," though they may be subject to another application, plug-in, or data source context that does not vary in this example. Conversely, the install secondary action option 408A is absent when the context of the "demo data" is "present," as this data doesn't need to be installed, though it may need to be edited, configured, or repaired.

Figure 6:
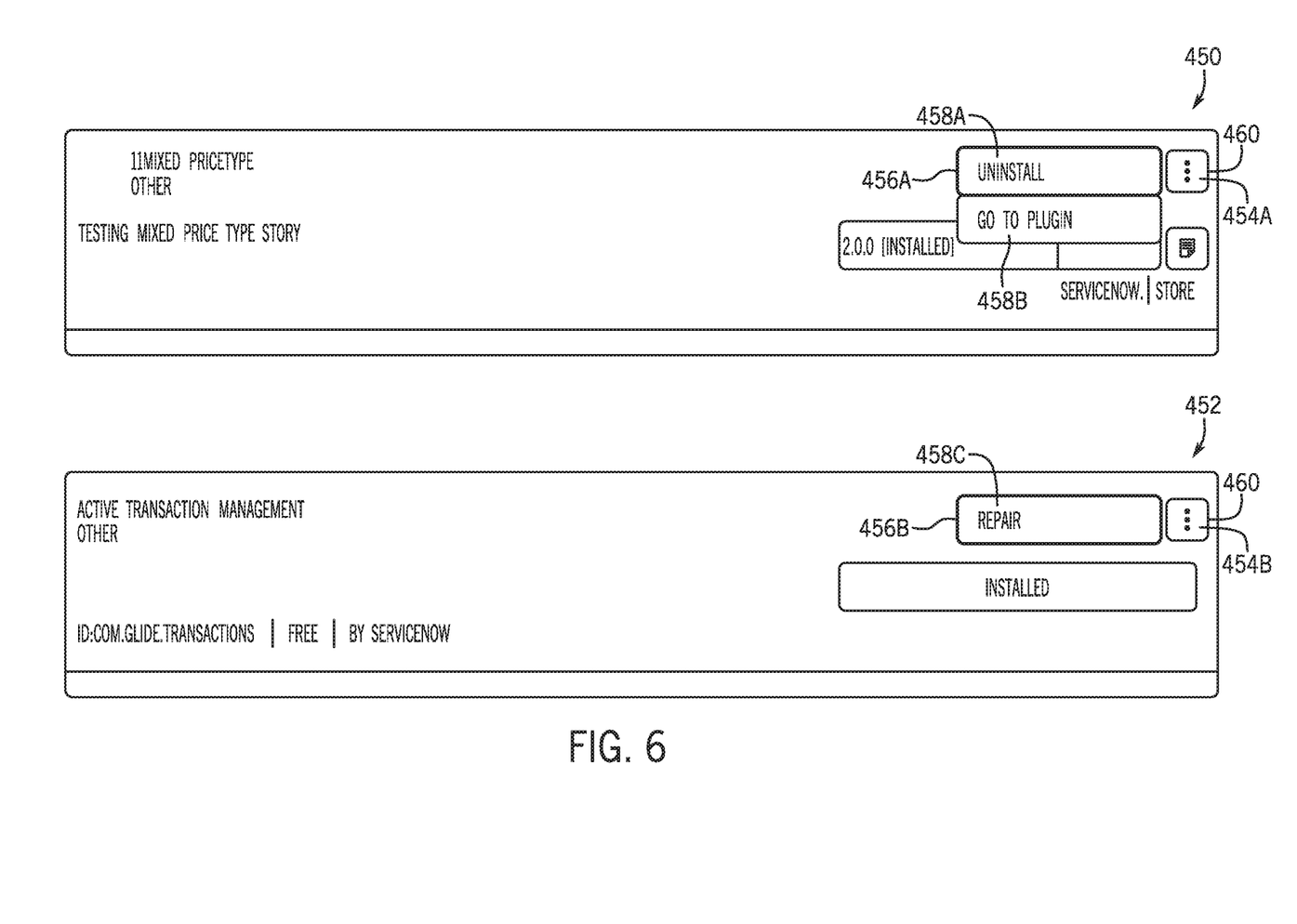
FIG. 6 is an embodiment of two interfaces comparing different overflow menus that may be generated based on different contexts, in accordance with aspects of the present disclosure.

FIG. 6 is an embodiment of an application management interface 450 and an embodiment of a plug-in management interface 452. The application management interface 450 and the plug-in management interface 452 each include an overflow icon 454 and a corresponding overflow menu 456 configured to be invoked when the overflow icon 454 is selected. Each overflow menu 456 further includes secondary action options 458 that may differ between the application management interface 450 and the plug-in management interface 452 due to the respective application and plug-in representing different contexts that an executable running as described herein may note as part of automatically populating the overflow menus 456. For example, as described herein, an application is a component that may be installed (e.g., implemented onto the client device 20) and uninstalled (e.g., removed from the client device 20). For this reason, the overflow menu 456A of the application management interface 450 may include an uninstall secondary action option 458A suitable for the context of an "installed" application. When selected, the uninstall secondary action option 458A may enable the user to uninstall the particular application associated with the application management interface 450. Furthermore, a navigate secondary action option 458B may be generated based on the context of a plug-in being installed for the respective application to enable the user to navigate to a particular plug-in associated with the application.

Contrarily, as described herein, a plug-in is a component that may be installed, but not typically uninstalled. Rather, the plug-in may be repaired (e.g., modified) when present (i.e., when the plug-in context is "present"). As such, the overflow menu 456B of the plug-in management interface 452 may include a repair secondary action option 458C when a plug-in context of "present" is determined by an executable routine that populates overflow menus in a context sensitive manner, as described herein.

In a further embodiment, the appearance of the secondary action options 458 may be configured to change when the user is about to select a respective secondary action option 458, such as when the user is hovering over the secondary action option 458 with a cursor prior to the selection. For example, as shown in FIG. 6, a border of the uninstall secondary action option 458A of the application management interface 450 and a border of the repair secondary action option 458C of the plug-in management interface 452 is highlighted. In this manner, the respective secondary action options 458 may better indicate to the user which secondary action option 458 is to be selected.

Figure 7:
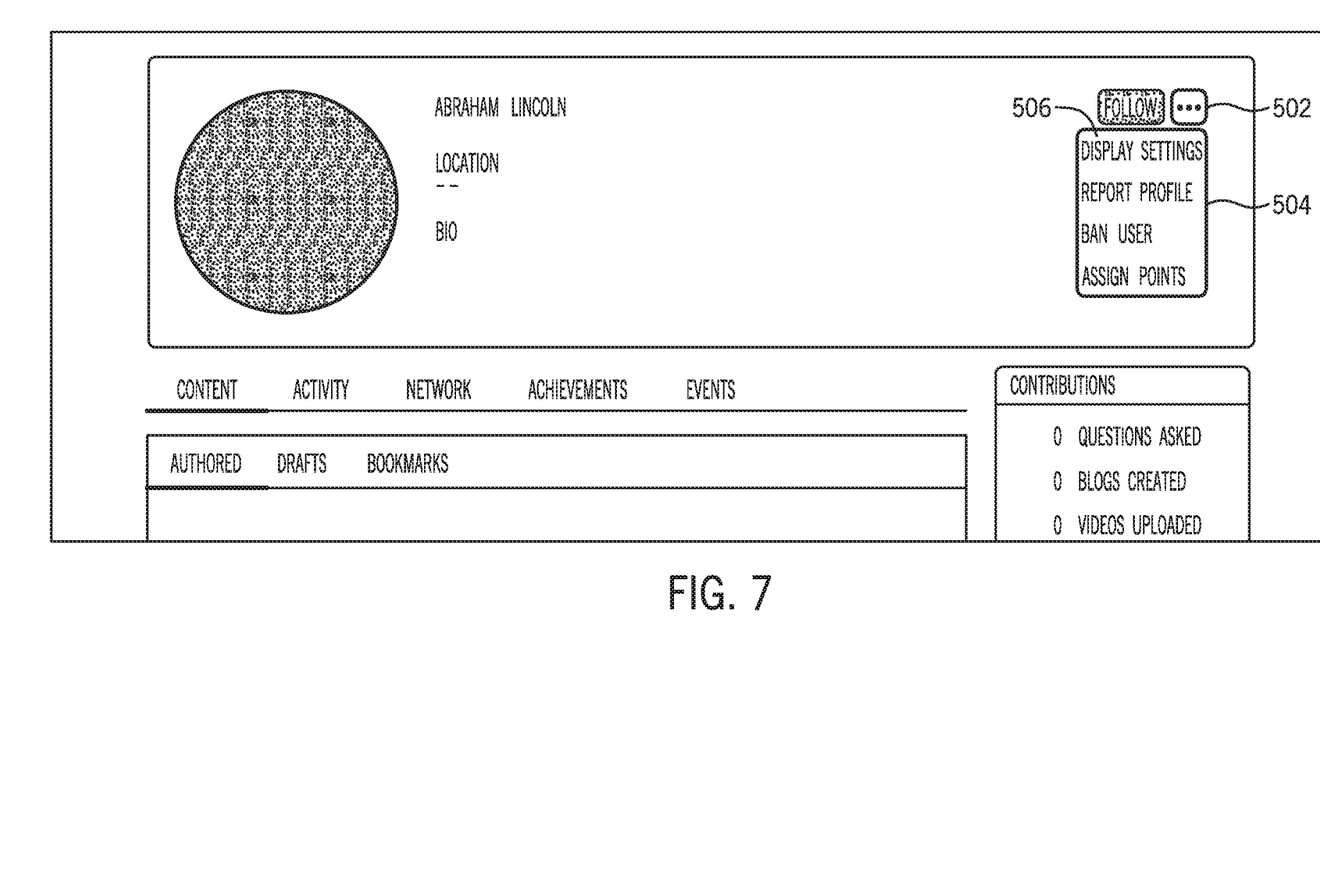
FIG. 7 is an embodiment of an interface that may be utilized for managing a forum profile, in which the interface has an overflow menu icon and an overflow menu, in accordance with aspects of the present disclosure.

FIG. 7 is an embodiment of a forum interface 500 illustrating another possible implementation of the context-based overflow icon and overflow menu. As an example, a user may utilize the forum interface 500 to manage profiles of a forum (e.g., community forum). An overflow icon 502 and a corresponding overflow menu 504 may be generated on the forum interface 500. Furthermore, the overflow icon 502 and/or the overflow menu 504 may be configured according to the context of one or more application, plug-ins, or data sources (e.g., a user profile in the present example) referenced by the forum interface 500.

In some embodiments, the secondary action options 506 are configured to perform an action directed to a profile with which the forum interface 500 is associated. As an example, the secondary action options 506 may be associated with secondary actions that include displaying settings of the profile, reporting the profile, banning the profile, assigning points to the profile, and the like. In particular embodiments, the automatically generated secondary action options 506 may be based on the currently referenced profile and one or more contexts associated with aspects of the referenced profile. That is, the overflow menu 504 of different profiles may have different secondary action options 506 based on the state or status of different aspects of a given profile. For example, the generated different secondary action options 506 may be automatically determined based on a type of profile, a time that the profile was created, an action performed by the profile, or another suitable parameter associated with the profile that may be construed as a context associated with the profile.

Figure 8:
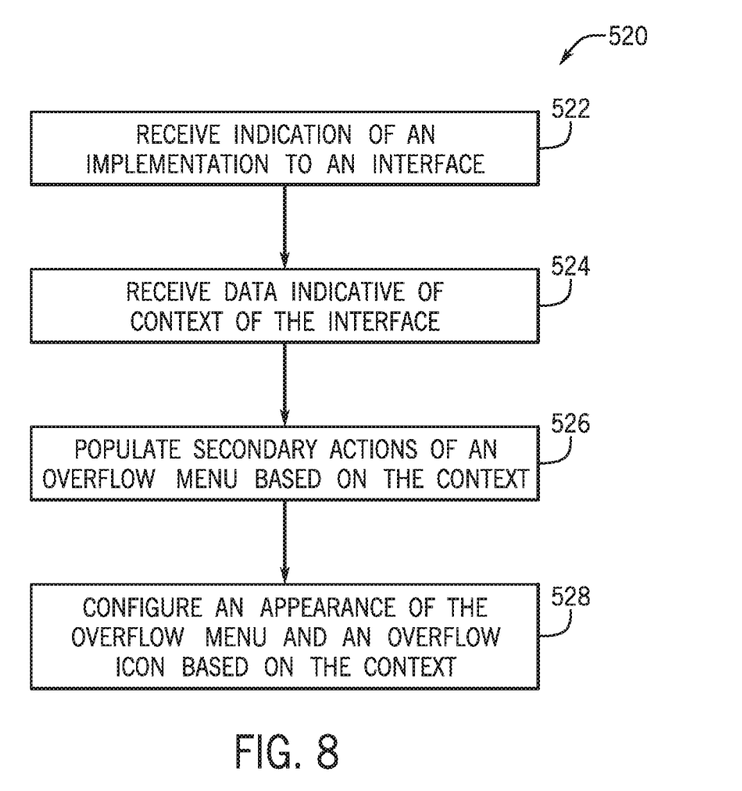
FIG. 8 is a block diagram illustrating an embodiment of a method that may be used to generate the overflow menu options, in accordance with aspects of the present disclosure.

FIG. 8 is a block diagram illustrating an embodiment of a processor-implemented method 520 that may be performed, such as by an executable-program as discussed herein, to populate an overflow menu for a certain interface based on context-related criteria for data, applications, and/or plug-ins referenced by the interface. At block 522, an indication may be received that indicates an interface for which an overflow menu is to be populated with context appropriate options. As an example, a user of a client device 20 may provide an indication of an application or user interface on which the present steps are to be applied to populate an overflow menu.

At block 524, data indicative of the context of date, applications, and/or plug-ins referenced by the interface may be acquired, such as by executing a coded script to scan for relevant features referenced by the interface and their corresponding context(s). As discussed herein, the context may be associated with a particular characteristic of the interface, such as a field to which the interface pertains, an appearance of the interface, actions that may be performed via the interface, and/or an accessibility or permissions associated with the interface, to name a few examples. The context may additionally or alternatively be associated with the client device 20 of the interface, such as a presence of a module (e.g., application) on the client device 20, the type of client device 20, and the like.

At block 526, an overflow menu is generated and the overflow menu is automatically populated with secondary actions based on the context(s) identified at step 524 pertaining to features referenced by the interface. That is, information from the data received at block 524 may be utilized to determine the secondary action options with which to populate the overflow menu. Moreover, secondary actions associated with the secondary action option are enabled.

At block 528, the appearance of the overflow menu and/or the overflow icon may be configured, if not set by other parameters of the interface. For example, the overflow icon and/or overflow menu may be positioned at particular locations on the interface. In another example, the overflow icon may be labeled or represented with certain symbols or in a certain manner based on the context. In yet another example, the overflow menu and/or the secondary action options of the overflow menu may be displayed in a certain manner based on the context. In general, the appearance of the overflow menu and/or the overflow icon may be configured to be user friendly and facilitate interactions between the user and the overflow menu and/or overflow icon.

The disclosed subject matter includes a presentation of context-based selectable options automatically used to populate an interface of a client device. In some embodiments, data indicative of a context of the interface is received to generate an overflow icon and an overflow menu to be displayed on the interface. Further, a plurality of secondary action options may be generated and displayed on the overflow menu based on context automatically determined for features related to the displayed interface window or screen. Each secondary action option is associated with a secondary action that may be performed via the client device. In certain embodiments, an appearance of the overflow icon and the overflow menu may be configured based on the received data. In this manner, the client device may display the interface that includes the overflow icon. Upon selection of the overflow icon, the overflow menu having the plurality of secondary action options is displayed on the interface of the client device. In general, the overflow icon and overflow menu is readily and automatically generated and customized for a particular interface. As such, a designer of the particular interface does not have to manually create the overflow icon and overflow menu.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a memory encoding processor-executable routines; and
one or more processors configured to access the memory and execute the processor-executable routines, wherein the routines, when executed by the one or more processors, cause the one or more processors to perform acts comprising:

analyzing coding stored on the memory, wherein the coding comprises data associated with a plurality of actions configured to execute via one or more features of an interface of a client device;

identifying a type of a feature of the one or more features executing the data based on the analyzing;

generating an overflow icon configured to be displayed on the interface based on the plurality of actions;

configuring an appearance of the overflow icon based on the feature; and generating an overflow menu configured to be displayed on the interface upon selection of the overflow icon;

wherein, in response to identifying that the type of the feature is a first plug-in, the routines are configured to cause the one or more processors to populate the overflow menu with a first set of selectable options associated with a first subset of the plurality of actions to enable the first subset of the plurality of actions to be performed via the first set of selectable options;

wherein, in response to identifying that the type of the feature is a second plug-in, the routines are configured to cause the one or more processors to populate the overflow menu with at least the first set of selectable options;

wherein, in response to identifying that the type of the feature is a first application that is a non-plug in, the routines are configured to cause the one or more processors to populate the overflow menu with a second set of selectable options associated with a second subset of the plurality of actions to enable the second subset of the plurality of actions to be performed via the second set of selectable options; and wherein, in response to identifying that the type of the feature is a second application that is a non-plug-in, the routines are configured to cause the one or more processors to populate the overflow menu with at least the second set of selectable options.

2. The system of claim 1, wherein the routines, when executed by the one or more processors, further cause the one or more processors to:

perform an action of the plurality of actions associated with selection of one of the first set of selectable options or one of the second set of selectable options.

3. The system of claim 1, wherein the routines, when executed by the one or more processors, further cause the one or more processors to generate an appearance of the overflow menu based on the one or more features.

4. The system of claim 3, wherein the appearance of the overflow menu comprises a particular position of the overflow menu on the interface, a font of the selectable options, or any combination thereof.

5. The system of claim 1, wherein the interface is a chat interface, a web based interface, an application management interface, a community forum interface, or any combination thereof.

6. The system of claim 1, wherein the first subset of the plurality of actions comprises modifying the feature, and wherein the second subset of the plurality of actions comprises installing the feature.

7. A system, comprising:

a memory encoding processor-executable routines; and one or more processors configured to access the memory and execute the processor-executable routines, wherein the routines, when executed by the one or more processors, cause the one or more processors to perform acts comprising:

analyzing coding stored on the memory, wherein the coding comprises data executed via a feature installed in the memory and referenced by an interface configured to be displayed on a client device;

identifying, based on the data, a plurality of actions associated with the feature;

identifying, based on the analyzing, a type of the feature executing the data;

generating a selectable overflow icon configured to be displayed on the interface based on the plurality of actions; and generating an overflow menu, wherein the overflow menu is invoked on the interface in response to a selection of the selectable overflow icon;

wherein, in response to identifying that the type of the feature is a plug-in, the routines are configured to cause the one or more processors to populate the overflow menu of the interface with a first plurality of selectable options, wherein each selectable option of the first plurality of selectable options is associated with an action of a first subset of the plurality of actions, and wherein a selection of a selectable option of the first plurality of selectable options via the overflow menu causes an associated action of the first subset of the plurality of actions to be performed;

wherein, in response to identifying that the type of the feature is an additional plug-in, the routines are configured to cause the one or more processors to populate the overflow menu of the interface with at least the first plurality of selectable options;

wherein, in response to identifying that the type of the feature is a first non-plug-in application, the routines are configured to cause the one or more processors to populate the overflow menu of the interface with a second plurality of selectable options and without the first plurality of selectable options, wherein each selectable option of the second plurality of selectable options is associated with an action of a second subset of the plurality of actions, and wherein a selection of a selectable option of the second plurality of selectable options via the overflow menu causes an associated action of the second subset of the plurality of actions to be performed; and wherein, in response to identifying that the type of the feature is a second non-plug-in application, the routines are configured to cause the one or more processors to populate the overflow menu of the interface with at least the second plurality of selectable options and without the first plurality of selectable options.

8. The system of claim 7, wherein the routines, when executed by the one or more processors, further cause the one or more processors to:

receive an indication of the selection of the selectable overflow icon; and display the overflow menu adjacent to the selectable overflow icon on the interface, wherein the first plurality of selectable options or the second plurality of selectable options is displayed on the overflow menu.

9. The system of claim 8, wherein the routines, when executed by the one or more processors, further cause the one or more processors to:

receive an indication of the selection of the selectable option of the first plurality of selectable options or an indication of the selection of the selectable option of the second plurality of selectable options; and perform the associated action of the first subset of the plurality of actions in response to receiving the indication of the selection of the selectable option of the first plurality of selectable options or perform the associated action of the second subset of the plurality of actions in response to receiving the indication of the selection of the selectable option of the second plurality of selectable options.

10. The system of claim 8, wherein the routines, when executed by the one or more processors, further cause the one or more processors to:
receive an additional indication of an additional selection of the selectable overflow icon; and
remove the overflow menu from display on the interface in response to receiving the additional indication.

11. The system of claim 8, wherein the first plurality of selectable options, the second plurality of selectable options, or both, are formatted in a column on the overflow menu.

12. The system of claim 7, wherein the first subset of the plurality of actions comprises repairing the plug-in, the additional plug-in, or both, and wherein the second subset of the plurality of actions comprises uninstalling the first non-plug-in application, the second non-plug-in application, or both.

13. A method, comprising:
analyzing coding that comprises data associated with an interface to be displayed on a client device;
determining, based on the data, one or more features referenced by the interface, wherein each feature of the one or more features, upon a selection via the interface, causes a respective action of a plurality of actions to be performed;
for each feature, determining the respective action associated with the feature;
identifying, based on the analyzing, a type of the one or more features;
generating an overflow icon configured to be displayed on the interface based on the plurality of actions, wherein the overflow icon is selectable via the client device;
generating an overflow menu;
in response to identifying that the type of the one or more features comprises a first plug-in, populating the overflow menu with a first plurality of selectable options, wherein selection of a first selectable option of the first plurality of selectable options causes the one or more features to perform a first associated action of the plurality of actions on a component referenced by the interface, wherein selection of a second selectable option of the plurality of selectable options causes the one or more features to perform a second associated action of the plurality of actions on the same component referenced by the interface;
in response to identifying that the type of the one or more features comprises a second plug-in, populating the overflow menu with at least the first plurality of selectable options;
in response to identifying that the type of the one or more features comprises a first application that is not a plug-in, populating the overflow menu with a second plurality of selectable options and without the first plurality of selectable options, wherein selection of a third selectable option of the second plurality of selectable options causes the one or more features to perform a third associated action of the plurality of actions on the same component referenced by the interface, wherein selection of a fourth selectable option of the plurality of selectable options causes the one or more features to perform a fourth associated action of the plurality of actions on the same component referenced by the interface;
in response to identifying that the type of the one or more features comprises a second application that is not a plug-in, populating the overflow menu with at least the second plurality of selectable options and without the first plurality of selectable options; and
displaying the overflow menu on the interface in response to a selection of the overflow icon.

14. The method of claim 13, comprising:
receiving an additional indication of the selection of the first selectable option, the second selectable option, or both, of the first plurality of selectable options;
performing the first associated action in response to receiving the additional indication of the selection of the first selectable option; or
performing the second associated action in response to receiving the additional indication of the selection of the second selectable option.

15. The method of claim 13, comprising configuring an appearance of the overflow icon and the overflow menu based on the one or more features.

\* \* \* \* \*

UNITED STATES PATENT AND TRADEMARK OFFICE
CERTIFICATE OF CORRECTION

PATENT NO. : 11,068,140 B2
APPLICATION NO. : 16/240471
DATED : July 20, 2021
INVENTOR(S) : Rakesh Malhotra, Sujit Sharma and Saurabh Khetan Page 1 of 1

It is certified that error appears in the above-identified patent and that said Letters Patent is hereby corrected as shown below:

In the Claims

Column 16, Line 58, Claim 8, please replace "is" with --, or both, are--.

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*